United States Patent
Paknad et al.

(10) Patent No.: US 8,700,581 B2
(45) Date of Patent: *Apr. 15, 2014

(54) SYSTEMS AND METHODS FOR PROVIDING A MAP OF AN ENTERPRISE SYSTEM

(75) Inventors: Deidre Paknad, Palo Alto, CA (US); Puttappaiah Muniyappa, Cupertino, CA (US); Bruce K. Martin, Jr., Mountain View, CA (US); Eran Palmon, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/404,079

(22) Filed: Feb. 24, 2012

(65) Prior Publication Data
US 2012/0150906 A1 Jun. 14, 2012

Related U.S. Application Data

(63) Continuation of application No. 11/512,880, filed on Aug. 29, 2006.

(51) Int. Cl.
*G06F 7/00* (2006.01)
*G06F 17/00* (2006.01)
*G06F 17/30* (2006.01)

(52) U.S. Cl.
USPC .......................................... 707/694; 707/756

(58) Field of Classification Search
USPC ................................ 707/999.102, 756, 694
See application file for complete search history.

(56) References Cited

U.S. PATENT DOCUMENTS

| | | | |
|---|---|---|---|
| 5,355,497 A | 10/1994 | Cohen-Levy |
| 5,701,472 A | 12/1997 | Koerber et al. |
| 5,903,879 A | 5/1999 | Mitchell |
| 6,115,642 A | 9/2000 | Brown et al. |
| 6,128,620 A | 10/2000 | Pissanos et al. |
| 6,151,031 A | 11/2000 | Atkins et al. |
| 6,173,270 B1 | 1/2001 | Cristofich et al. |
| 6,332,125 B1 | 12/2001 | Callen et al. |
| 6,343,287 B1 | 1/2002 | Kumar et al. |
| 6,401,079 B1 | 6/2002 | Kahn et al. |
| 6,539,379 B1 | 3/2003 | Vora et al. |
| 6,622,128 B1 | 9/2003 | Bedell et al. |
| 6,738,760 B1 | 5/2004 | Krachman |
| 6,944,597 B2 | 9/2005 | Callen et al. |
| 7,076,439 B1 | 7/2006 | Jaggi |
| 7,127,470 B2 | 10/2006 | Takeya |

(Continued)

OTHER PUBLICATIONS

"mySAAP ERP Human Capital Management: Maximizing Workforce Potential", <a href=http://web.archive.org/web/20060823140053/www.sap.com/solutions/business-suite/erp/hcm/index.exp:?http://web.archive.org.web/2006 . . . </a>, 2006.

(Continued)

*Primary Examiner* — Alexey Shmatov
(74) *Attorney, Agent, or Firm* — Shumaker & Sieffert, P.A.

(57) ABSTRACT

An exemplary system and method for providing a map of an enterprise system is provided. The method comprises accessing data describing an element from one or more sources. One or more objects are associated with the element. At least one relationship is identified between the one or more objects. A map is then generated of an enterprise system comprised of the one or more objects based on the at least one identified relationship.

16 Claims, 6 Drawing Sheets

(56) References Cited

U.S. PATENT DOCUMENTS

| | | |
|---|---|---|
| 7,197,716 B2 | 3/2007 | Newell et al. |
| 7,283,985 B2 | 10/2007 | Schauerte et al. |
| 7,386,468 B2 | 6/2008 | Calderaro et al. |
| 7,433,832 B1 | 10/2008 | Bezos et al. |
| 7,895,229 B1 | 2/2011 | Paknad |
| 2002/0007333 A1 | 1/2002 | Scolnik et al. |
| 2002/0010708 A1 | 1/2002 | McIntosh |
| 2002/0022982 A1 | 2/2002 | Cooperstone et al. |
| 2002/0083090 A1 | 6/2002 | Jeffrey et al. |
| 2002/0103680 A1 | 8/2002 | Newman |
| 2002/0143595 A1 | 10/2002 | Frank et al. |
| 2002/0143735 A1 | 10/2002 | Ayi et al. |
| 2002/0184068 A1 | 12/2002 | Krishnan et al. |
| 2002/0184148 A1 | 12/2002 | Kahn et al. |
| 2003/0004985 A1 | 1/2003 | Kagimasa et al. |
| 2003/0014386 A1 | 1/2003 | Jurado, Jr. |
| 2003/0046287 A1 | 3/2003 | Joe |
| 2003/0051144 A1 | 3/2003 | Williams |
| 2003/0069839 A1 | 4/2003 | Whittington et al. |
| 2003/0097342 A1 | 5/2003 | Whittingtom |
| 2003/0110228 A1 | 6/2003 | Xu et al. |
| 2003/0229522 A1 | 12/2003 | Thompson et al. |
| 2004/0034659 A1 | 2/2004 | Steger |
| 2004/0060063 A1 | 3/2004 | Russ et al. |
| 2004/0068432 A1 | 4/2004 | Meyerkopf et al. |
| 2004/0088283 A1 | 5/2004 | Lissar et al. |
| 2004/0088332 A1 | 5/2004 | Lee et al. |
| 2004/0088729 A1 | 5/2004 | Petrovic et al. |
| 2004/0138903 A1 | 7/2004 | Zuniga |
| 2004/0187164 A1 | 9/2004 | Kandasamy et al. |
| 2004/0193703 A1 | 9/2004 | Loewy et al. |
| 2004/0204947 A1 | 10/2004 | Li et al. |
| 2004/0260569 A1 | 12/2004 | Bell et al. |
| 2005/0071251 A1 | 3/2005 | Linden et al. |
| 2005/0114241 A1 | 5/2005 | Hirsch et al. |
| 2005/0203821 A1 | 9/2005 | Petersen et al. |
| 2006/0095421 A1 | 5/2006 | Nagai et al. |
| 2006/0136435 A1 | 6/2006 | Nguyen et al. |
| 2006/0149712 A1* | 7/2006 | Kindsvogel et al. .............. 707/3 |
| 2006/0230044 A1 | 10/2006 | Utiger |
| 2007/0100857 A1 | 5/2007 | DeGrande et al. |
| 2007/0156418 A1 | 7/2007 | Richter et al. |
| 2007/0162417 A1 | 7/2007 | Cozianu et al. |
| 2007/0271517 A1 | 11/2007 | Finkelman et al. |
| 2009/0037376 A1 | 2/2009 | Archer et al. |

OTHER PUBLICATIONS www.pss-systems.com retrieved from www.archive.org any linkage Dec. 5, 2008.

www.pss-systems.com retrieved from www.archive.org Dec. 8, 2005.

Zhu et al., "Query Expansion Using Web Access Log Files," Lecture Notes in Computer Science, 2005, vol. 3588/2005, pp. 686-695, Springer-Verlag Heidelberg, 2005.

U.S. Appl. No. 11/505,665, filed Aug. 16, 2006 entitled "Systems and Methods for Utilizing Organization-Specific Classification Codes".

U.S. Appl. No. 11/505,537, filed Aug. 16, 2006 entitled "Systems and Methods for Utilizing an Enterprise Map to Determine Affected Entities".

Office Action from corresponding U.S. Appl. No 11/512,880 dated Oct. 22, 2012 (21 pages).

* cited by examiner

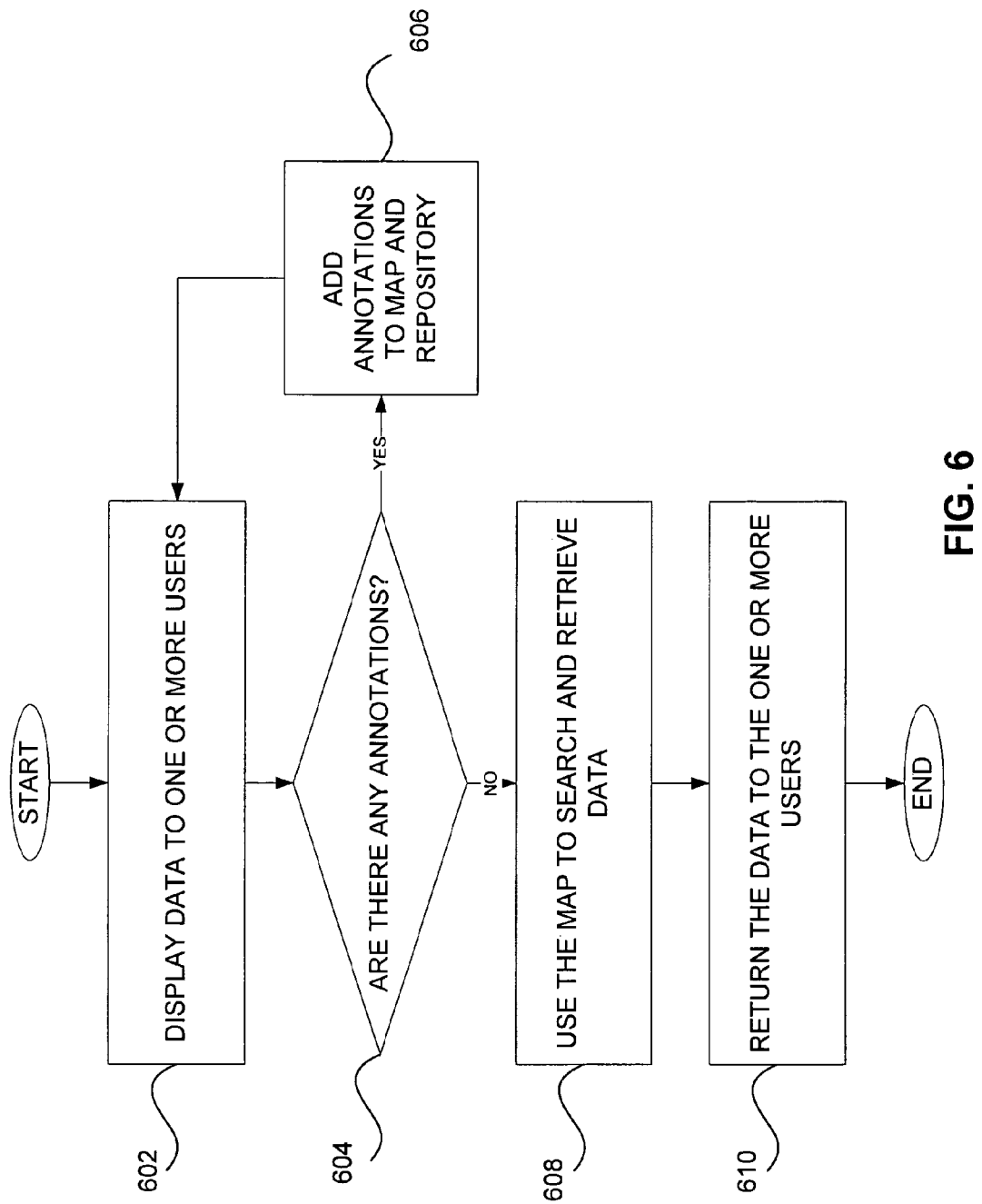

SYSTEMS AND METHODS FOR PROVIDING A MAP OF AN ENTERPRISE SYSTEM

This application is a continuation of U.S. patent application Ser. No. 11/512,880 filed Aug. 29, 2006, the entire content of which is incorporated herein by reference.

CROSS-REFERENCE TO RELATED APPLICATIONS

The present application is related to U.S. patent application Ser. No. 11/505,665 filed on Aug. 16, 2006 and entitled "SYSTEMS AND METHODS FOR UTILIZING ORGANIZATION-SPECIFIC CLASSIFICATION CODES," and to U.S. patent application Ser. No. 11/505,537 filed Aug. 16, 2006 and entitled "SYSTEMS AND METHODS FOR UTILIZING AN ENTERPRISE MAP TO DETERMINE AFFECTED ENTITIES," which are herein incorporated by reference.

BACKGROUND OF THE INVENTION

1. Field of the Invention

The present invention relates generally to enterprise system management, and more particularly to systems and methods for providing a map of an enterprise system.

2. Description of Related Art

Conventionally, information retrieval is accomplished by keyword searches, author searches, date searches, and so forth. If a specific document is sought, very specific parameters may be input into a system that maintains documents in order to locate the specific document sought. In an enterprise system, the abundant number of documents and document storage locations can make document searching and retrieval particularly challenging.

Disadvantageously, a user searching for the specific document in an enterprise system does not have knowledge of some or all of these specific parameters. For example, if a user wants to locate documents associated with a particular tax audit, various authors, dates, keywords, and so forth may be associated with a set of documents that satisfy the particular documents sought. Accordingly, the user may enter search parameters that will most likely return a set of documents the user may sift through in order to manually locate the specific documents that will satisfy the documents associated with the particular tax audit, for instance. Searching through all the documents or a large sub-set of documents in the enterprise system is often time consuming and inefficient.

Traditional records management systems allow a record administrator to select a class or classes of records and a date range solely for identifying data stored within the particular records management system. Disadvantageously, these records management systems do not allow identification of employees, organizations, other repositories, or systems because there is no known relationship between them. The identification of a class or classes of records captures data and evidence for the identified classes of records, and may not take into consideration the people associated with the records.

Conventionally, individuals manually determine the affected and involved people in a matter. There is typically no purpose-built application to perform this determination. Instead, the determination is usually a manual process using interviews, research through employee directories and organizational charts, and so forth.

Further, various systems may delete the documents over time. Thus, a user may not be able to locate the documents pertinent to a search request if some or all of the documents have been deleted.

SUMMARY

Exemplary systems and methods for providing a map of an enterprise system are provided. According to one method, data describing an element is accessed from one or more sources. One or more objects are associated with the element. At least one relationship is identified between the one or more objects.

A map is then generated of an enterprise system based on the at least one relationship. According to some embodiments, users are allowed to make updates to the map. The map may be generated based on the updates. The updates to the map may be tracked in order to preserve a record of changes, according to some embodiments. In further embodiments, one or more historical versions of the map may be stored and subsequently provided for allowing the users to search for past versions of the one or more objects.

The users are allowed to search for the one or more objects utilizing the map. The data describing the element may comprise metadata, according to some embodiments. The one or more objects may be accessed based on data describing the one or more objects and/or based on the at least one relationship between the objects Annotations may be added to the map, according to some embodiments. These annotations may be added by the users, for example. Alternatively, an application within the enterprise system can provide the annotations. According to one embodiment, the annotations comprise legal holds.

BRIEF DESCRIPTION OF THE DRAWINGS

FIG. 6. illustrates a flow diagram of an exemplary process for adding annotations to the map.

DETAILED DESCRIPTION OF EXEMPLARY EMBODIMENTS

Embodiments of the present invention provide a map of an enterprise system which comprises objects representing various elements comprising the enterprise system, attributes of the elements, and relationships between the elements. The elements of the enterprise system include repositories, systems, people, organizations, information, and other physical or logical elements involved in the storage, management, manipulation, authorship, ownership, retention, disposal, preservation, production and organization of data, as well as instances or classes of data, information, documents, files and records.

The map is generated, updated, and/or maintained by a map engine associated with the enterprise system. The map engine accesses or is provided data from a multiplicity of sources describing elements of the enterprise system, and from this data the map engine creates objects and relationships representing the elements and their relationships within the enterprise system.

The map may be utilized to search for, locate, organize and access physical and logical elements of the enterprise system, based upon the objects and relationships in the map, which represent the elements. Exemplary uses of the map include the preservation and production processes for legal and investigatory matters, support of electronic data discovery processes, information and data retention management, and other policy-based information management processes. The map may be utilized to access attributes of, and relationships between, objects in the map. In addition, the map may be utilized for organizing physical and electronic data located in various locations and for allowing users to provide annotations, such as holds, to the map and/or the data represented by the map.

Figure 1:
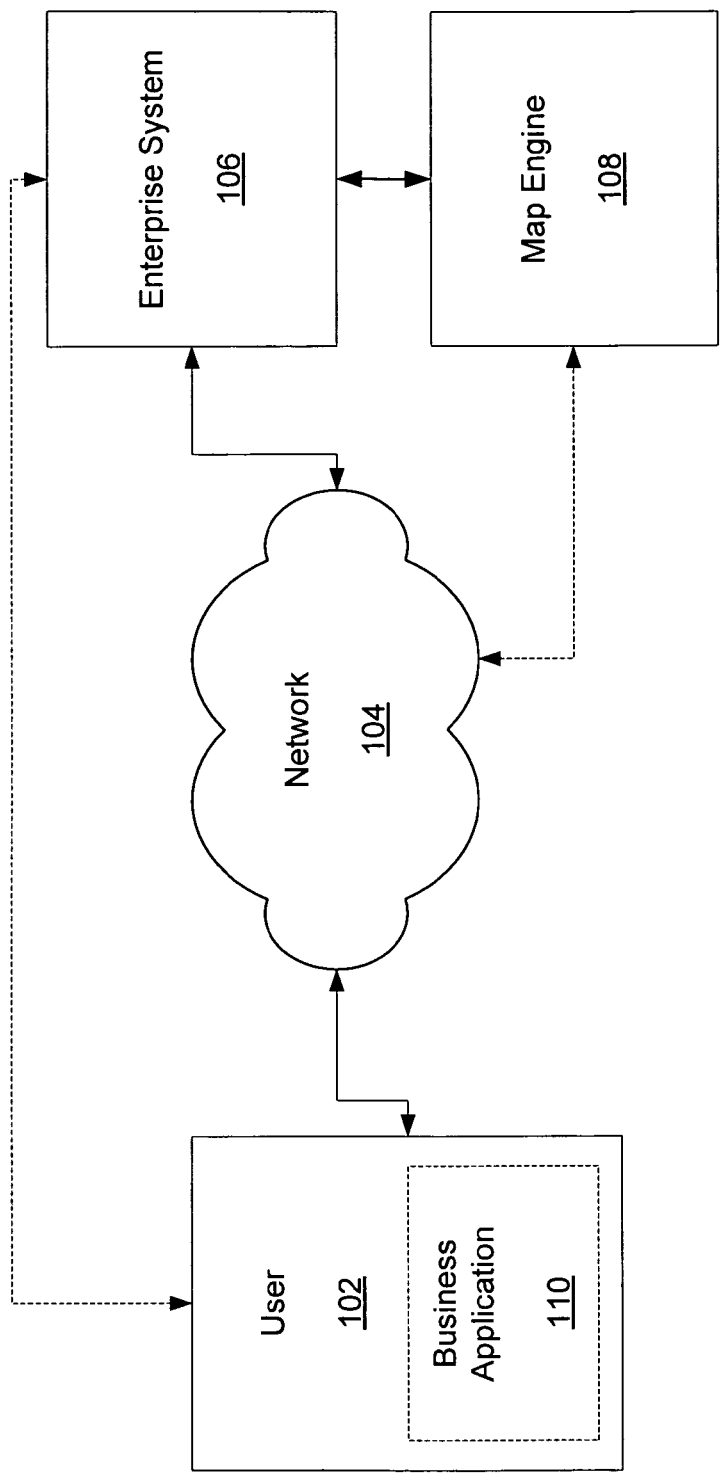
FIG. 1 illustrates a schematic diagram of an exemplary environment for providing a map of an enterprise system.

Turning now to FIG. 1, a schematic diagram of an exemplary environment for providing a map of an enterprise system is illustrated. The environment comprises at least one user 102 coupled via a network 104 to an enterprise system 106. Any type of network 104 may be utilized to couple the user 102 to the enterprise system 106, such as a wide area network, a local area network, or a peer-to-peer network. Alternatively, the user 102 can couple to the enterprise system 106 directly. In some embodiments, more than one network and/or more than one type of network may be utilized to allow the components of the environment to communication with each other.

Any number of users 102 may be present in the environment. The user 102 is an individual accessing or utilizing the map in order to perform some action to, or with, an object within the map, or an element associated with the enterprise system 106, which is represented by the object. In exemplary embodiments, the element comprises repositories, people, organizations, information types, classification codes, documents, or files. Alternatively, the element may comprise other data that is storable, such as, for example, audio, video, streaming media, structured database records, paper documents, or e-mail communications.

A device associated with the user 102 may comprise a business application 110 which performs actions related to the map. For example, the business application 110 may interpret the map, update the map, publish annotations into the map, create an execute workflows based upon the contents of the map, or search and retrieve data in the enterprise system 106 by utilizing the map. Any type of business application 110 may be provided. The user 102 may access the business application 110 residing in the enterprise system 106, according to an alternative embodiment.

Various embodiments may be utilized in any type of enterprise system 106. For example, the enterprise system 106 may comprise any number of servers, client devices, and repositories located physically or electronically anywhere. Repositories may comprise both physical and electronic storage media including warehouses, filing cabinets, hard drives, and other paper, physical, or digital media storage device. The enterprise system 106 may include various types of data in various mediums, such as documents, text, structured database records, audio and video media, and so forth. The enterprise system 106 may also include data about documents stored in yet another system, such as architecture of a records management system and paper documents stored in a warehouse. In addition, the enterprise system may include people, organizations, information types, classification codes and other elements involved in the storage, management, manipulation, authorship, ownership, retention, disposal, preservation, production and organization of data. As discussed herein, an element is a part of the enterprise system 106, such as a file, a person, a classification code, and so forth. One or more objects represent elements, characteristics associated with the elements, inter-element relationships, and so forth.

The exemplary map engine 108 provides a map comprising a structure that organizes the elements associated with and/or stored within the enterprise system 106. The map engine 108 utilizes information types, organizations, storage locations, people, and other objects and their relationships, as will be discussed in more detail in connection with FIG. 3, to provide an overall map structure that may be used to derive relationships between the elements, such as people, repositories, information types, classification codes, and organizations, as discussed herein. Accordingly, the user 102 can utilize a map generated by the map engine 108 in order to, for example, navigate, search, retrieve, update, or annotate the objects within the map, or to act directly upon the elements. The map engine 108 is coupled to the enterprise system 106, or may otherwise be included as part of the enterprise system 106, according to some embodiments. According to some embodiments, the user 102 directly interacts with the map engine 108 via the network 104.

Although the user 102 may not directly interact with the map in some embodiments, the user can access objects and relationships in the map, or the data in the enterprise system 106 via the map by requesting objects, relationships, or data via a user interface, providing updates to objects, relationships, or data, providing annotations upon objects, and so forth. In exemplary embodiments, the user 102 can perform a search for elements and the map engine 108 then accesses objects that represent the elements of the enterprise system 106 (discussed in further detail herein). The objects identify the elements comprising the enterprise system 106 and their relationship with each other. In an alternative embodiment, the map may be displayed to the user 102 so the user can directly interact with the map.

The map provided by the map engine 108 may comprise a centralized map. The centralized map contains a map structure for all of the elements, represented by objects, relationships, and annotations. Remote systems (e.g., outside of the enterprise system 106) may be accessed to retrieve the data or updates to the data describing the elements.

Figure 4:
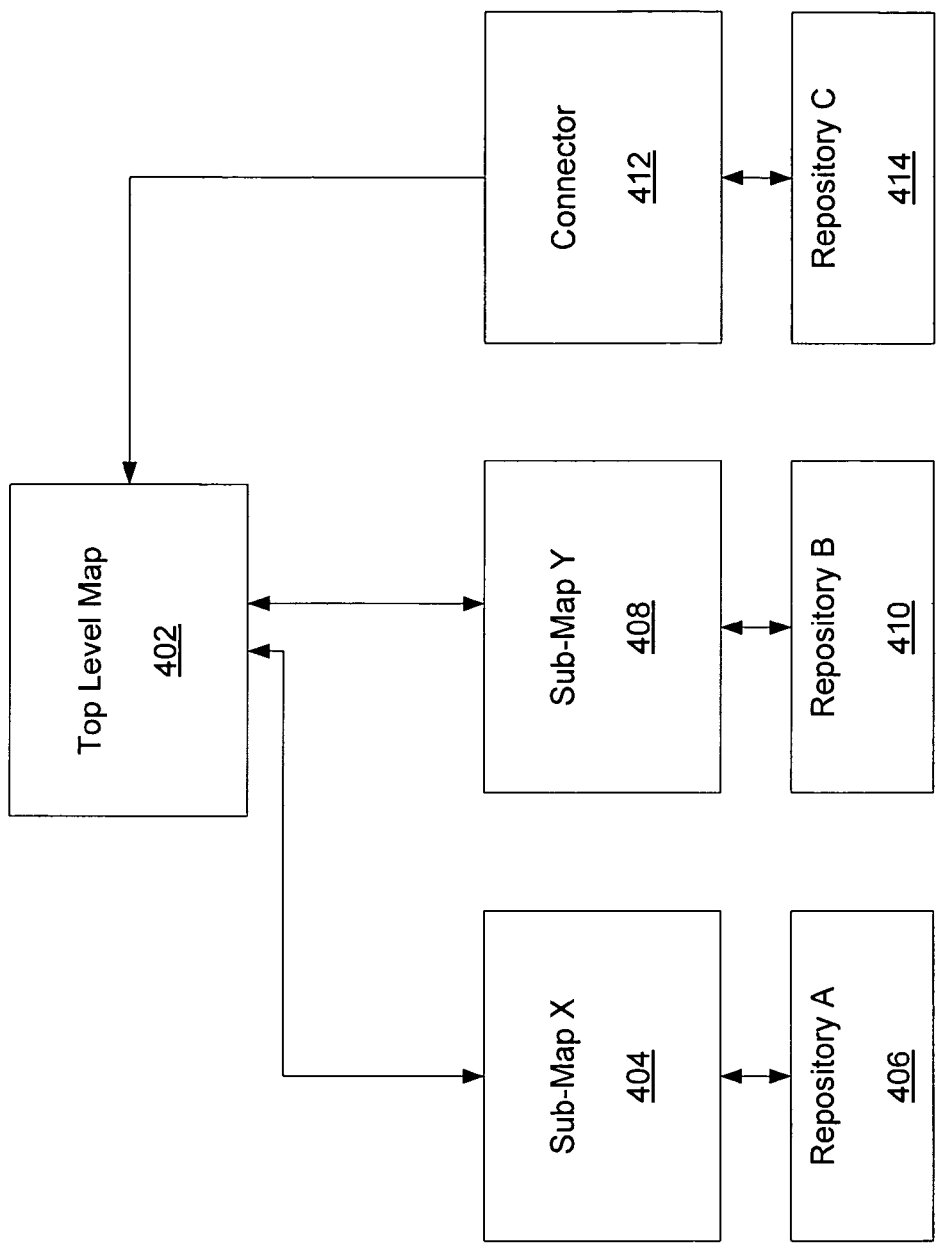
FIG. 4 illustrates a schematic diagram of an exemplary top level map segmented into sub-maps.

In an alternative embodiment, the map may be segmented into a top-level map and at least one set of sub-maps, as discussed in association with FIG. 4. This segmented map structure may be referred to as a federated map. In other words, the map may be stored, managed, or instantiated in a centralized manner. Alternatively, the map can be factored into sub-maps that are stored, managed, or instantiated in a distributed set of systems. The map comprises a single cohesive map that may, optionally, be implemented in one or more systems.

In one example, the user 102 can use the map to search for one or more documents related to a contract with Company A, for litigation purposes. The user 102 can request that a hold annotation be placed on the one or more documents related to the litigation, so that the one or more documents are preserved for the litigation purpose. Accordingly, the map is annotated with the hold requested by the user 102. As discussed herein, the user 102 can request the hold annotation via the business application 110.

Figure 2:
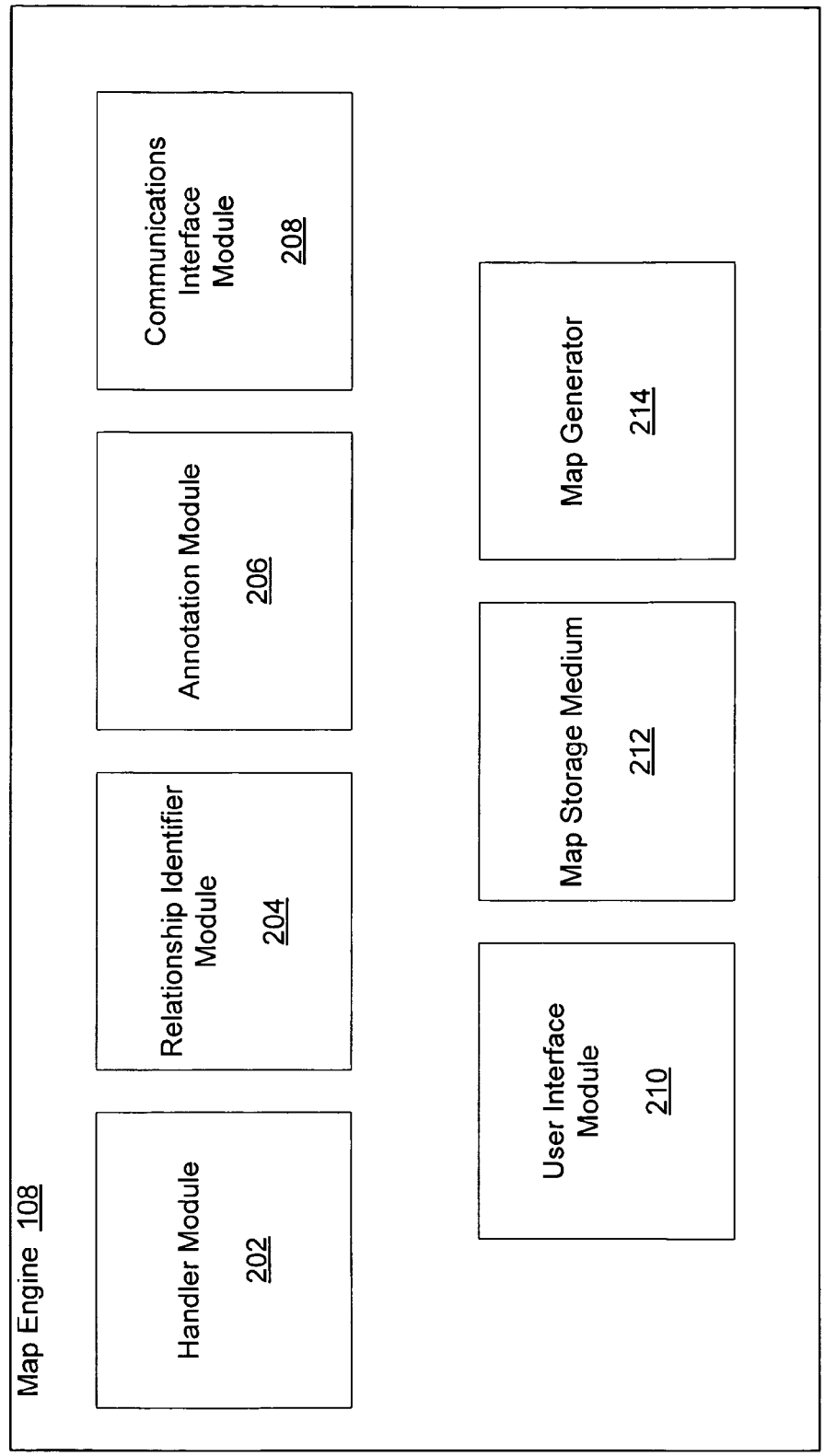
FIG. 2 illustrates a schematic diagram of an exemplary map engine.

Referring now to FIG. 2, a schematic diagram of an exemplary map engine 108 is shown. In some embodiments, some of the components of the map engine 108 are located at a device (e.g., computing device) associated with the user 102, and operate within the device to provide functionalities described below. In other embodiments, the map engine 108 is completely located at the device associated with the user 102. In yet other embodiments, the map engine 108 is completely separate from the device of the user 102.

A handler module 202 is configured to access data describing the elements from various sources of the enterprise system 106, such as repositories, directories, applications, the Internet, and/or third party repositories. In one embodiment, the handler module 202 is a crawler configured to crawl databases for updates to the data describing the elements of the enterprise system 106 (e.g., data and meta-data about stored in external systems or map objects), to be used to create or update map objects and relationships.

A relationship identifier module 204 reviews the data accessed by the handler module 202 and associates an object with the element. The relationship identifier module 204 can also identify relationships between one or more of the objects that describe the elements. The relationship identifier module 204 may also review the current contents of the map when identifying relationships. Objects may be associated with an element using a natural organization of data describing elements in the enterprise system 106, using pre-programmed rules or configurations describing preferred object/element associations, or using data or meta-data stored in the enterprise system 106. For example, data describing a person (e.g., employee, contractor or other person associated with an enterprise), such as the person's name, email address, employee identifier, and mailing address may be used to create a person object. Similarly, data describing the attributes of a business organization may be associated with an organization object in the map. The relationships may be based on such objects as organization, author, and repository, for example. In exemplary embodiments, the structure of the map is based on the relationships between these objects. The relationships may be identified based on department, authorship, roles, keywords, metadata, and/or any other data. For example, a relationship between a document and a person may indicate that the document was written by John Doe from the accounting department, or a relationship between two people may indicate that the one person works for John Doe from the accounting department. The various relationships will be discussed in more detail in connection with FIG. 3. According to exemplary embodiments, the map identifies the objects and inter-object relationships within the enterprise system 106. The map describes the objects, such as people, documents, organizations, or repositories, and so forth, stored in the one or more repositories associated with the enterprise system 106 using data describing the elements and relationships.

In some embodiments, the relationship may be specified according to an order. For example, the element may be defined as a base element, while another element comprising the particular relationship is defined as a second element. Thus, the second element is related to the base element because, for example, the second element and the base element are associated with a same department. Accordingly, map relationships between two objects describe each of the base element and the second element in the map, for instance, where both elements are represented by objects. In some embodiments, a name, a type, or a set of properties may be assigned to the relationship.

According to some embodiments, the map provides data about various types of relationships, via the map objects and relationships between the map objects, which may be searched by the user 102 in order to locate the data that corresponds with the map objects, as discussed herein. For example, a search may request documents within a specific repository, the specific repository defining the relationship between the documents within the specific repository, or the search may request a person or an organization associated with a litigation case. Any type of relationship between the objects representing the elements may be defined.

In exemplary embodiments, a classification code comprises an element and is represented by an object in the map. The classification code may comprise, for example, an organization-specific classification code (OSCC). The OSCC comprises an information type or class and an organization identifier assigned to the element. In further embodiments, the OSCC comprises policies associated with the object, which may indicate the repository that stores the element and a records manager. OSCC generation and utilization is discussed further in association with U.S. patent application Ser. No. 11/505,665 filed on Aug. 16, 2006 and entitled "System and Method for Utilizing Organization Specific Classification Codes," which is herein incorporated by reference.

In exemplary embodiments, an annotation module 206 is provided for adding, modifying, or deleting annotations associated with the map and/or the objects contained within the map, the objects representing elements within the enterprise system 106. For example, the user 102 may discover a set of documents from a search, which the enterprise system 106 and/or the map engine 108 perform for the user 102 utilizing the map. The user 102 may then annotate the set of documents with a legal hold. The legal hold annotation is then added to the map by the map engine 108, so that the set of documents can no longer be modified or deleted, thus preserving the set of documents. According to some embodiments, the legal hold annotation comprises an alert to one or more users and/or to the enterprise system 106 that the set of documents should not be deleted or modified. The legal hold annotation may also indicate that the set of documents should be collected or may indicate an order for preservation of the set of documents, for example. Any type of annotation can be added, modified, or deleted. For example, the map may be annotated with policy data, disposal date data, version data, and so forth. As discussed herein, the objects associated with the map may be utilized to describe the elements and/or annotations to the map.

A communications interface module 208 may also be provided. The communications interface module 208 is utilized for allowing data to be exchanged between the user 102 and the map engine 108. Any type of communications interface module 208 may be provided. The communications interface module 208 may be utilized to search and/or access the one or more objects based on metadata associated with the elements, based on the relationships between the objects, and so forth. Accessing the objects may include searching the objects according to some embodiments.

In exemplary embodiments, the communications interface module 208 comprises an application programming interface (API) configured to allow access to the map. The business application 110 calls the API to perform some function with the map such as accessing objects and relationships within the map, or providing additions, deletions, or modifications to the map (e.g., annotations to the map objects). The business application 110 can also communicate a search request from the user 102. Using the API, the business application 110 traverses the map to identify one or more objects that represent the elements that matches the search request.

The handler module 202 can then retrieve the elements or data describing the elements identified by the one or more objects. In exemplary embodiments, the handler module 202 is the interface to the data comprising the enterprise system 106. According to exemplary embodiments, the map represents a topology, or relationships between people, systems, and documents that comprise the objects within the enterprise system 106, such as the objects relevant to a discovery process. In some embodiments, the map may directly identify data. According to other embodiments, the map includes data that identifies a group, persons, and/or repositories (e.g., elements), rather than specific information associated with the group, persons, and/or the repositories, for example.

According to alternative embodiments, the map can identify the elements comprising the enterprise system 106 via the objects in various manners, such as by location, type, person, organization, or classification code. For example, an object "A" indicates to the handler module 202 where the data that correlates with the object "A" is located in the databases or other storage associated with the enterprise system 106. Accordingly, the handler module 202 can retrieve the particular object representing one or more elements within the enterprise system 106 that correlates with the object "A" from the databases or other storage.

The object retrieved by the handler module 202 can be returned to the user 102 via the business application 110. The relationships between objects that comprise the structure of the map are discussed in further detail in associated with FIG. 3.

A user interface module 210 is configured to allow the user 102 to access, review, read, query and edit the map. In some embodiments, the map may be often accessed and modified during a course of a litigation matter (e.g., a new information repository may be discovered and entered into the map by legal staff). In some embodiments, the user interface module 210 may comprise the business application (e.g., business application 110) that performs actions related to the map (e.g., interact with a litigation management engine to derive a list of people and systems affected by a litigation matter). In some embodiments, the user interface module 210 may be optional.

A map storage medium 212 may be provided for storing the map. Alternatively, the map may be stored in a storage medium within the enterprise system 106 or in any other storage medium. More than one storage medium may be provided for storing the map. The map storage medium 212 may store different versions of the map, as the map changes according to time, annotations, and other updates, for example. Older versions of the map may be useful to provide a historical view of the map and its evolution over time. In alternative embodiments, the map may be stored in a database within the enterprise system 106 or in a database located outside of the map engine 108, but coupled thereto. In further embodiments, the map is not stored, but is generated wherever it is needed.

An exemplary map generator 214 utilizes objects that represent the elements comprising the enterprise system 106, and any other data retrieved about the enterprise system 106 to construct the map (structure) discussed herein. The map is utilized by the map engine 108 to navigate, organize, and maintain, for example, the elements comprising the enterprise system 106. The structure comprising the map can be generated by utilizing the relationships identified by the relationship identifier 204 to provide an overview of the enterprise system 106. The user 102 can then search for the data using the map via the GUI, as discussed herein. Thus, the map can provide organized insight into the elements included in the enterprise system 106 and indicate relationships between the objects that describe the elements. For example, the map may comprise a map inclusive of litigation-relevant objects (e.g., representing people) so that preservation & production of data may be performed efficiently and effectively, with a high degree of integrity and minimal redundant effort.

The generation of the map by the map generator 214 may be automated. For example, the map generator 214 may generate or update the map each time an annotation or an update is received. Alternatively, the map generator 214 may generate or update the map according to predetermined time intervals. As discussed herein, the map storage medium 212 can store versions of the map, so previous structures of the enterprise system 106 can be accessed as historical maps, as discussed herein. Historical versions of the map and annotations may be preserved for future use enabling retrospective views of the map.

Although FIG. 2 shows various components comprising the exemplary map engine 108, fewer or more components may comprise the map engine 108 and still fall within the scope of various embodiments.

Figure 3:
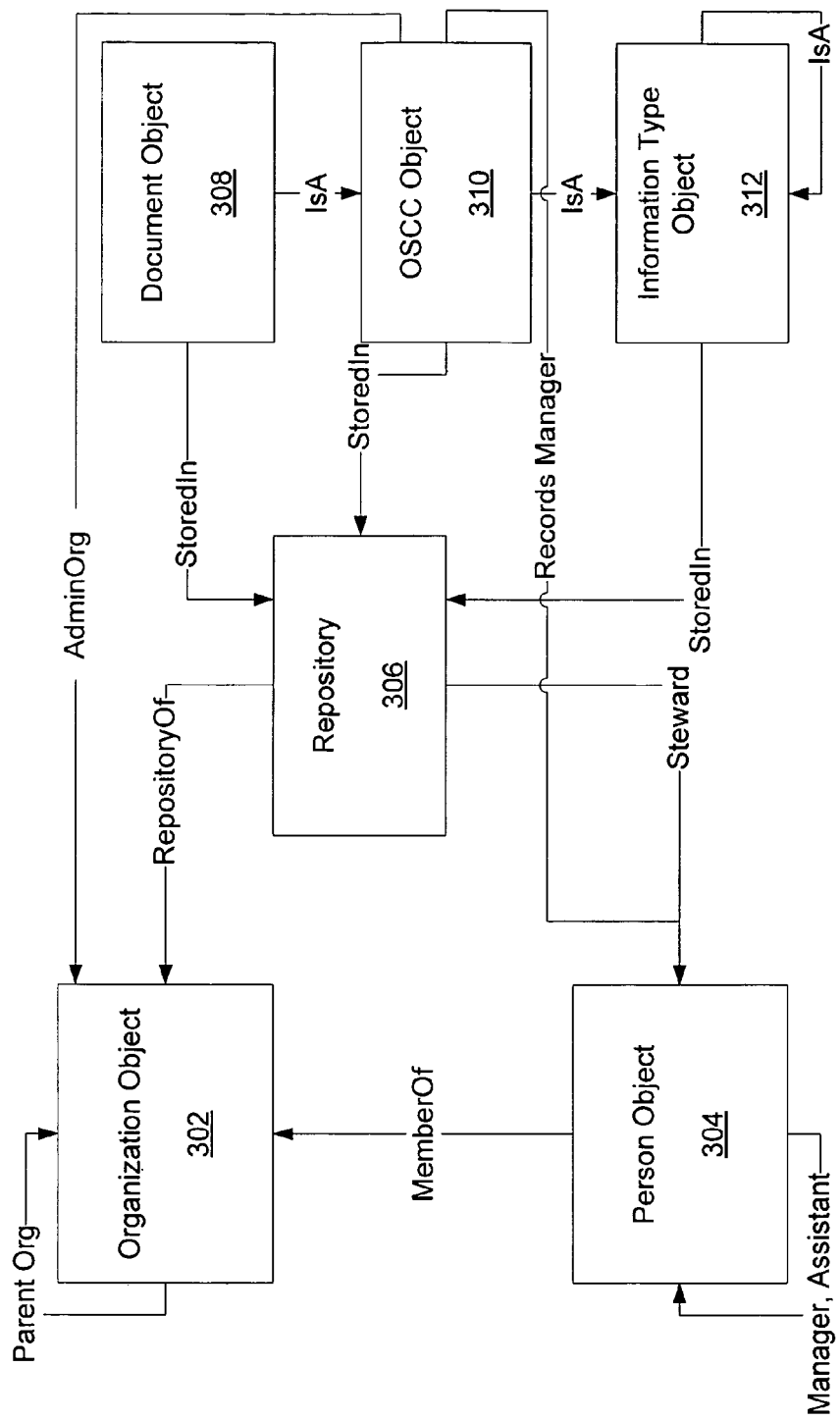
FIG. 3 illustrates a schematic diagram of exemplary relationships between one or more objects comprising the map of the enterprise system.

FIG. 3 illustrates a schematic diagram of exemplary relationships between one or more objects comprising the map of the enterprise system 106. As discussed herein, the map establishes exemplary relationships between the objects that describe the elements, as shown. Exemplary embodiments of the present invention take advantage of the fact that people have certain types of relationships to organizations, and information repositories have a responsible person/people (i.e., stewards) and associated disposal and retention policies.

An organization object 302 includes information about a business unit or other group of people. As shown, organizations may be hierarchically organized. Any type of organization object 302 may be utilized. For example, the organization object 302 may include a name of the organization, a parent organization, persons in the organization, repositories or storage mediums utilized by the organization, geography associated with the organization, organization locations, accounting codes, and so forth. One or more organizations may be represented by the organization object 302 and the one or more organizations may be designated according to a hierarchical structure, such as a parent organization.

A person object 304 represents an individual with a role within the organization. For example, the person object 304 may include an employee in the organization. The person object 304 may describe elements by a name, contact information, role in the organization, relationship with other persons 304, organizational affiliations, repository affiliations, responsibilities, job title, and so forth. The person object 304 may be related to the organization object 302 by virtue of a "MemberOf" relationship, which indicates that each person is a member of one or more organizations. For example if a person works at a NY office of an investment bank, the user (i.e., person object 304) is affiliated with the NY office (i.e., organization object 302).

A repository object 306 represents storage locations. The repository object 306 may include any electronic or non-electronic information repositories, such as a warehouse, a file server, or any other storage mediums. The repository object 306 may include name, system type and details, physical location, network location, access methods, stewards (i.e., the persons and the person object 304 responsible), the organizations that use the repository, information types stored in the repository, and so forth. Accordingly, the repository object 306 has a relationship with the other objects shown in FIG. 3.

The map may also be stored in the repository associated with a repository object 306. The repository may include the map storage medium 212 discussed in FIG. 2. More than one repository may be provided, as discussed herein. When the user 102 (FIG. 1) annotates the map, the maps stored in the repository 306 and/or the map storage medium 212 are updated. According to an alternative embodiment, a different version of the map is maintained for each of the users 102 that provide annotations, modifications, updates, and so forth to the map.

A document object 308 represents information about documents, papers, text, files, metadata, and item of information stored in a repository. The information represented by the document object 308 is related to the repository object 306 by being stored in the repository identified by the repository object 306.

An OSCC object 310 is a classification code assigned to the element associated with the document object 308. The OSCC object 310 may indicate information type, location in the repository 306 for the information, policy information, such as a records manager, and so forth. Once the OSCC object 310 is assigned to the item of information from the document object 308, the classification may be stored in the repository associated with the repository object 306. Each classification may be associated with one or more persons responsible for managing the information assigned the specific classification. Thus, the person object 304 may be related to the OSCC object 310.

In exemplary embodiments, an element described by data comprising the document object 308 is related to the OSCC object 310 by a hierarchical taxonomy of types. In other words, the information represented by the document object 308 may include OSCC data and be organized according to the OSCC data.

An information type object 312 utilizes the OSCC object 310 classification and the data describing the element from the document object 308 to classify a type of the data. The data or the elements may be organized as a hierarchical taxonomy, for example, utilizing the information type. The information type object 312 includes name, identifiers, such as record keeping codes, parent type, repository affiliations (i.e., default location for the information), organization affiliations, and so forth. A data type or document may, optionally, be associated with one or more repositories via the repository object 306 discussed herein. Accordingly, the information type object 312 is related to the repository object 306 and to the OSCC object 310.

The map engine 108 utilizes the relationships between the various objects described in FIG. 3 to generate the map. Although FIG. 3 specifies the relationship between the various objects and the various objects that may have specified relationships, any type of relationships may be identified between any of the objects. Further, as discussed herein, the objects may describe relationships between the elements comprising the enterprise system 106, the elements, themselves, and so forth.

As discussed herein, the business application 110 may utilize the map to identify the objects that satisfy the search or to access data describing the element represented in the object. The elements that correspond to those objects are then retrieved by, for example, the handler module 202 or any other retrieval mechanisms, from the enterprise system 106, such as databases, repositories, or any other data sources comprising the enterprise system 106. Although FIG. 3 shows various relations between various objects that represent the elements in the enterprise system 106, further embodiments may comprise other objects and/or relationships between the objects and still fall within the scope of various embodiments.

FIG. 4 shows a schematic diagram of an exemplary federated map which comprises a top level map segmented into sub-maps. A top level map 402, such as the map of the enterprise system 106 discussed herein, is provided. The top level map 402 may be stored in the map storage medium 212 (FIG. 2) and/or the one or more repositories, such as the repository 306 discussed in FIG. 3. One or more sub-maps may be provided, for performing mapping generation, maintenance, updating, and/or any other map functions for a part of the lop level map 402.

For example, a sub-map X 404 may be coupled to a repository A 406 and a sub-map Y 408 may be coupled to a repository B 410. Thus, the sub-map X 404 and the sub-map Y 408 identify data stored in the repository A 406 and the repository B 410, respectively. A record management system may, optionally, be associated with each of the sub-map X 404 and the sub-map Y 408, the record management systems configured to generate the sub-map X 404 and the sub-map Y 408 and to perform any other functions. The records management systems may include information about records stored in a warehouse or other records repository, for example. The records management systems can include an inventory, such as box/crate number, type of information within the box/crate, and so forth. Any type of system may be provided for allocating functions to one or more sub-maps, such as the sub-map X 404, the sub-map Y 408, and/or any other sub-map.

A connector 412 may be provided for retrieving data to update the top level map 402. The connector 412 may be coupled to a repository (e.g., repository C 414) storing the objects utilized to update the top level map 402. The connector 412 may comprise a crawler, an indexer, and so forth. The connector 412 may be utilized to search remote systems for the objects to update the map, according to some embodiments. Any type of connector 412 may be provided. Although the sub-map X 404, the sub-map Y 408, and the connector 412, and respective repositories are illustrated in FIG. 4, any number of sub-maps, connectors, and/or repositories may be provided and still fall within the scope of various embodiments.

Figure 5:
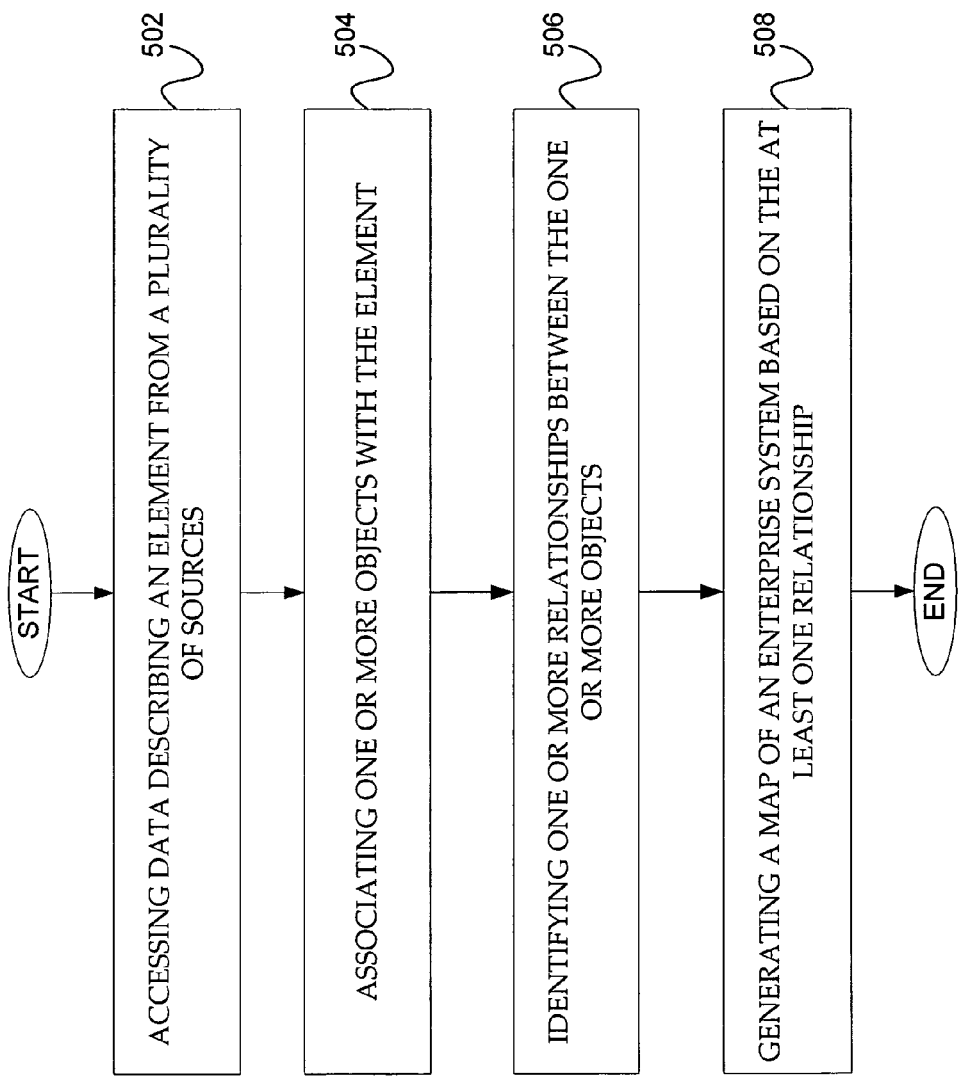
FIG. 5 illustrates a flow diagram of an exemplary process for providing a map of the enterprise system.

FIG. 5 illustrates a flow diagram of an exemplary process for providing a map of the enterprise system, such as the enterprise system 106 discussed in FIG. 1. At step 502, data that describes an element is accessed from a plurality of sources is accessed. The data may be accessed from any sources, such as from the information repositories or by crawling the Internet or any other network or by entering the data manually. As discussed herein, the elements comprise any part of the enterprise system 106, such as a file, a person, or a classification code. The data that describes the element may comprise metadata or any other type of data. The data or metadata may be associated with people, organizations, repositories, information types, classification codes, or data contained within repositories, for example.

At step 504, one or more objects are associated with the element. As discussed herein, the one or more objects may represent data types, repositories where data is stored, people, and so forth. The one or more objects may be comprised of data that describes the element, such as the name of a person or the type of a file. The one or more objects represent the element. A plurality of elements comprise the enterprise system 106, with each object describing each element. The objects may be accessed and searched based on the data describing the elements, the objects, and/or the relationships between the objects, for example.

At step 506, one or more relationships of the one or more objects are identified. As discussed herein, the data may be represented by one or more objects. The relationship between the organization object 302 and the document 308 may be identified, for example. Each object may have more than one relationship with one or more other objects. The relationships between the one or more objects may comprise a type of relationship or a responsibility, for example. Any type of relationship may be identified, as discussed herein. The one or more objects may also describe relationships between the elements.

At step 508, a map of an enterprise system comprised of the one or more objects is generated based on the at least one relationship. As discussed herein, the map of the enterprise system comprises a structure of objects that are associated with the data describing the elements. The business application 110 can then utilize the structure (i.e., the map) to locate the data or the elements desired.

For example, the enterprise system 106 and the elements comprising the enterprise system 106 can be represented by the map. The map indicates the relationships between the objects associated with the data, such as documents, people, organizations, repositories, etc. Further, because the map represents relationships between the one or more objects, the elements and/or data comprising the enterprise system 106 can be preserved, annotated, and better searched, for example. As discussed herein, for instance, the map may indicate where documents including a specific code (i.e., OSCC) are stored.

As discussed herein, the one or more users may be allowed to search for the elements utilizing the map. As discussed herein, the one or more users, such as the user 102 discussed in FIG. 1 can enter search terms or perform searches via the GUI or the business application 110. The map is then searched according to the search terms entered.

The map can identify, classify, organize, and maintain, for example, the elements comprising the enterprise system 106, as discussed herein. The map may be generated based on updates to the map associated with annotations or any other modifications. According to alternative embodiments, a different map is generated according to different search parameters. For example, if the user 102 wants information related to Sarbanes Oxley policies, the map may be generated with the objects related to Sarbanes Oxley policies according to policy type, while if the user 102 wants the information by a specific author, the map may be generated with the objects according to names of persons in the organization. Accordingly, information sought by the user 102 may be more easily identified and retrieved according to the organization of the map.

Referring now to FIG. 6, a flow diagram of an exemplary process for adding annotations to the map is shown. At step 602, data is displayed to one or more users, such as the user 102 discussed in FIG. 1. The data may be displayed to the user as a result of a search requested by the user, for example. As discussed herein, the user 102 can access a GUI at the enterprise system 106 for searching the map over the network 104 or directly.

At step 604, the enterprise system 106, the connector 412, and/or any other system or device, determines whether any annotations have been made by the user 102. Alternatively, the annotations may be received from an application or another system.

At step 606, the annotations are added to the map and to the map storage medium 212 and/or the repository 306. As discussed herein, any type of annotations may be added, such as legal holds, policy information, or any other information. For example, disposal policies regarding when documents may be destroyed may be added to the map as an annotation. The annotations may be associated with the map generally or with individual objects or elements, such as the objects discussed in FIG. 3. The annotations may include user edits to the objects and/or relations between the objects, according to some embodiments.

Once the annotations are added to the map at step 606, the updated map is then utilized to perform any further searches by the one or more users at step 602. For example, workflows may be generated based on the annotations and an impact of the annotations on related data and the objects.

As discussed herein, according to one embodiment, different maps may be utilized to perform searches for different users. If there are no annotations to add to the map, the map engine 108 can search and retrieve data utilizing the map, at step 608.

Specifically, the map engine 108 can utilize the map, such as by traversing the map, to identify objects in the map, the objects representing the elements stored in the repository or other elements comprising the enterprise system 106. Because the map includes various relationships between the objects and the elements represented by the map objects, the user 102 can request various types of information according to one or more search parameters the user 102 can enter via the GUI. For example, the user 102 can request all documents or other data that have the annotation "legal hold" associated with the documents or other information. Any type of search parameters may be utilized to retrieve the information represented by the map.

Once the objects are searched and retrieved at step 608, the data corresponding to the objects is returned to the one or more users at step 610. Historical versions of the map may also be provided. Thus, the user 102 can search for and receive versions of data represented by the map objects at various points in time. Accordingly, different types of annotations may exist in association with the historical versions of the map. For example, the user 102 may want to know what information types existed at a point in the past, such as which individuals were responsible for data and/or systems at a given point in time. The user 102 can access various types of historical data by requesting one or more historical versions of data, which the map engine 108 can search for utilizing historical versions of the map.

While various embodiments have been described above, it should be understood that they have been presented by way of example only, and not limitation. For example, any of the elements associated with the enterprise map may employ any of the desired functionality set forth hereinabove. Thus, the breadth and scope of a preferred embodiment should not be limited by any of the above-described exemplary embodiments.

What is claimed is:

1. A method for providing a map of an enterprise system, comprising:

executing instructions stored in memory, wherein execution of the instructions by a processor:

accesses data describing a document from one or more sources;

associates one or more map objects associated with the map of the enterprise system with the document, including associating a document object in the one or more map objects with the document, wherein the one or more map objects includes a repository object, the repository object representing a repository where the document is stored, and wherein one of the one or more map objects associated with the document includes an indication of a location in the repository where the document is stored;

identifies at least one relationship between the one or more map objects, including identifying a relationship between the document object and the repository object;
generates the map of the enterprise system based on the at least one relationship;
accesses the map objects associated with the map by searching the map, the search being based on the at least one relationship between the map objects and a search request received from a user, the search comprising a map traversal to identify one or more map objects matching the search request;
transmits for display the map and the identified one or more map objects matching the search request; and
retrieve the document based on the indication of the location in the repository.

2. The method recited in claim 1, wherein the execution of the instructions by the processor further comprises adding one or more annotations to the map.

3. The method recited in claim 2, wherein the one or more annotations are added by the one or more users.

4. The method recited in claim 2, wherein the one or more annotations are added by one or more applications associated with the enterprise system.

5. The method recited in claim 2, wherein the one or more annotations comprise legal holds.

6. The method recited in claim 1, wherein the execution of the instructions by the processor further comprises tracking updates to the map in order to preserve a record of changes.

7. The method recited in claim 6, wherein generating the map includes modifying the map with the updates.

8. The method recited in claim 1, wherein the execution of the instructions by the processor further comprises providing historical versions of the map for allowing the one or more users to search for past versions of the map objects.

9. The method recited in claim 1, wherein the execution of the instructions by the processor further comprises utilizing the map objects associated with the map to search for the document element.

10. The method recited in claim 1, wherein the execution of the instructions by the processor further comprises updating the map based on automatic discovery of the document element.

11. The method recited in claim 1, wherein the execution of the instructions by the processor further comprises updating the map based on user inputs.

12. The method recited in claim 1, wherein the execution of the instructions by the processor further comprises assigning one or more classifications to the document element.

13. The method recited in claim 1, wherein the data describing the document element comprises metadata associated with the document element.

14. The method recited in claim 1, wherein the execution of the instructions by the processor further comprises accessing the map objects associated with the map based on data describing the map objects.

15. A method for providing a map of an enterprise system, comprising:
executing instructions stored in memory, wherein execution of the instructions by a processor:
accesses data describing a document from one or more sources;
associates one or more map objects associated with the map of the enterprise system with the document, including associating a document object in the one or more map objects with the document,
wherein the one or more map objects includes a repository object, the repository object representing a repository where the document is stored, and
wherein one of the one or more map objects associated with the document includes an indication of a location in the repository where the document is stored;
identifies at least one relationship between the one or more map objects, including identifying a relationship between the document object and the repository object;
generates the map of the enterprise system based on the at least one relationship; accesses the map objects associated with the map by searching the map, the search being based on the at least one relationship between the map objects and a search request received from a user, the search comprising a map traversal to identify one or more map objects matching the search request;
segments the map into sub-maps, the sub-maps configured to perform a map function for a part of the map, the sub-maps including a first sub-map coupled to the repository and configured to identify data stored in the repository, and the sub-maps including a second sub-map coupled to a second repository and configured to identify data stored in the second repository;
transmits for display the map and the identified one or more map objects matching the search request; and
retrieves the document based on the indication of the location in the repository.

16. The method of claim 15, wherein execution of the instructions by the processor:
add annotations to the map;
update the map to incorporate the annotations;
perform further searches using the updated map.

* * * * *